US012800139B2

(12) United States Patent
Zhang

(10) Patent No.: US 12,800,139 B2
(45) Date of Patent: Nov. 17, 2026

(54) FAN LIGHT

(71) Applicant: Weiyi Zhang, Shenzhen (CN)

(72) Inventor: Weiyi Zhang, Shenzhen (CN)

( * ) Notice: Subject to any disclaimer, the term of this patent is extended or adjusted under 35 U.S.C. 154(b) by 0 days.

(21) Appl. No.: 19/295,483

(22) Filed: Aug. 8, 2025

(65) Prior Publication Data

US 2025/0362012 A1 Nov. 27, 2025

(30) Foreign Application Priority Data

Aug. 4, 2025 (CN) ......................... 202511086358.5

(51) Int. Cl.

| | |
|---|---|
| ***F21V 33/00*** | (2006.01) |
| ***F21S 4/28*** | (2016.01) |
| ***F21V 17/00*** | (2006.01) |
| ***F21V 17/06*** | (2006.01) |
| ***F21V 23/00*** | (2015.01) |
| ***F21V 23/06*** | (2006.01) |
| *F21Y 105/18* | (2016.01) |

(52) U.S. Cl.

CPC ............ *F21V 33/0096* (2013.01); *F21S 4/28* (2016.01); *F21V 17/007* (2013.01); *F21V 17/06* (2013.01); *F21V 23/008* (2013.01); *F21V 23/06* (2013.01); *F21Y 2105/18* (2016.08)

(58) Field of Classification Search

CPC .... F21V 33/0096; F21V 17/007; F21V 23/06; F04D 25/088; F04D 29/646

See application file for complete search history.

(56) References Cited

U.S. PATENT DOCUMENTS

| | | | | |
|---|---|---|---|---|
| 12,173,889 | B1 * | 12/2024 | Zhu | F04D 29/34 |
| 12,326,235 | B1 * | 6/2025 | Zheng | F21S 8/043 |
| 12,345,393 | B1 * | 7/2025 | Zheng | F21V 17/164 |
| 2021/0222868 | A1 | 7/2021 | Xu et al. | |
| 2023/0077609 | A1 | 3/2023 | Zhang et al. | |
| 2023/0304650 | A1 * | 9/2023 | Bai | F21K 9/237 |
| 2024/0117813 | A1 | 4/2024 | Wang et al. | |
| 2025/0383077 | A1 * | 12/2025 | Wei | F21V 33/0096 |

FOREIGN PATENT DOCUMENTS

| | | | | |
|---|---|---|---|---|
| CN | 211146148 U | * | 7/2020 | |
| CN | 213023878 U | * | 4/2021 | |
| KR | 200493258 Y1 | * | 2/2021 | F04D 29/002 |

* cited by examiner

*Primary Examiner* — Christle I Marshall

(57) ABSTRACT

A fan light is provided, including: a central assembly, which includes a housing and a control mechanism mounted inside the housing, where the housing can be connected to an external mounting structure; a fan blade assembly, which is detachably in pivotal connection to the control mechanism; and a lamp frame assembly, which includes a connector connected to the housing, and a first lamp frame and a second lamp frame that are connected to the connector. The first lamp frame and the second lamp frame are configured to have a first state of being rotatably unfolded relative to the connector and surrounding the fan blade assembly, and a second state of being rotatably folded relative to the connector. The fan light can conveniently switch states and is convenient for storage and transportation, and damage is avoided. Meanwhile, difficulty of operations cannot be increased.

10 Claims, 9 Drawing Sheets

FAN LIGHT

TECHNICAL FIELD

The present disclosure relates to the technical field of household appliances, and more particularly to, a fan light.

BACKGROUND

With the rapid development of the times and the improvement of the living standard, there are more and more types of household appliances.

At present, a fan light has become a widely used household appliance, which has both a lighting function and a fan function. In most of existing fan lights, protective covers or protective housings are added outside fan blades to play a protection role and make the appearance more beautiful. The existing protective housings and protective covers are mostly of integrated structures, so that the fan lights have large packaging volumes, high transportation costs, and relatively single styles. The products are easily damaged because they are unfolded during transportation. Since some fan lights are disassembled into loose parts for packaging, the packaging volume is small, but customers have to assemble these loose parts by themselves. It is inconvenient to use the fan lights, and the user experience is poor. There is a need for an improved technical solution.

SUMMARY

In view of the above content, the present disclosure aims to at least solve one of the technical problems in the prior art. To this end, the present disclosure provides a fan light. A fan blade assembly is detachably connected to a central assembly, and a lamp frame assembly is configured to have a first state of rotatable unfolding and a second state of rotatable folding, so that it is convenient for the fan light to switch between a working state and a non-working state, and storage convenience and transportation safety of the fan light are improved. Meanwhile, difficulty of operations of a user will not be increased. The fan light has a simple structure and is suitable for being applied to large-scale industrial production.

To this end, in a first aspect, an embodiment of the present disclosure provides a fan light, including:

- a central assembly, which includes a housing and a control mechanism mounted inside the housing, where the housing is capable of being connected to an external mounting structure;
- a fan blade assembly, which is detachably in pivotal connection to the control mechanism; and
- a lamp frame assembly, which includes a connector connected to the housing, and a first lamp frame and a second lamp frame that are connected to the connector, where the first lamp frame and the second lamp frame are configured to have a first state of being rotatably unfolded relative to the connector and surrounding the fan blade assembly, and a second state of being rotatably folded relative to the connector.

Preferably, the connector includes a first connecting rod and a second connecting rod that are respectively connected to two opposite sides of the housing; a first head end of the first connecting rod and a second head end of the second connecting rod are respectively connected to the housing; a first tail end of the first connecting rod and a second tail end of the second connecting rod respectively extend away from the housing; two ends of the first lamp frame are respectively rotatably connected to the first tail end and the second tail end; two ends of the second lamp frame are correspondingly respectively rotatably connected to the first tail end and the second tail end; and the first lamp frame and the second lamp frame are capable of being rotatably unfolded into a roughly frame structure and/or being rotatably folded to one side of the housing facing away from the fan blade assembly.

Preferably, a first pivot hole and a second pivot hole are formed in the first tail end of the first connecting rod; a third pivot hole and a fourth pivot hole are formed in the second tail end of the second connecting rod; a first pivot shaft correspondingly connected to the first pivot hole is arranged at one end of the first lamp frame; a second pivot shaft correspondingly connected to the second pivot hole is arranged at one end of the second lamp frame; a third pivot shaft correspondingly connected to the third pivot hole is arranged at another end of the first lamp frame; and a fourth pivot shaft correspondingly connected to the fourth pivot hole is arranged at another end of the second lamp frame.

Preferably, the first connecting rod includes a first rod shell slantways extending outwards and downwards from the housing and a first rod cover covering the first rod shell; the first rod shell is provided with a first pivot slot and a second pivot slot in the first tail end; the first rod cover forms the first pivot hole and the second pivot hole respectively together with the first pivot slot and the second pivot slot; the second connecting rod includes a second rod shell slantways extending outwards and downwards from the housing and a second rod cover covering the second rod shell; the second rod shell is provided with a third pivot slot and a fourth pivot slot in the second tail end; and the second rod cover forms the third pivot hole and the fourth pivot hole respectively together with the third pivot slot and the fourth pivot slot.

Preferably, the first rod shell is provided with a first pivot block at the first tail end; the first pivot slot, the second pivot slot, and a first accommodating slot located below the first pivot slot and the second pivot slot are formed in the first pivot block; a first pivot cover capable of covering the first pivot slot and the second pivot slot is arranged at the first tail end of the first rod cover; a first accommodating block capable of accommodating the first accommodating slot is arranged at one end of the first lamp frame; a second accommodating block capable of accommodating the first accommodating slot is arranged at one end of the second lamp frame; the first pivot shaft is arranged at a tail end of the first accommodating block; the second pivot shaft is arranged at a tail end of the second accommodating block;

- the second rod shell is provided with a second pivot block at the second tail end; the third pivot slot, the fourth pivot slot, and a second accommodating slot located below the third pivot slot and the fourth pivot slot are formed in the second pivot block; a second pivot cover capable of covering the third pivot slot and the fourth pivot slot is arranged at the second tail end of the second rod cover; a third accommodating block capable of accommodating the second accommodating slot is arranged at one end of the second lamp frame; a fourth accommodating block capable of accommodating the second accommodating slot is arranged at another end of the second lamp frame; the third pivot shaft is arranged at a tail end of the third accommodating block; and the fourth pivot shaft is arranged at a tail end of the fourth accommodating block.

Preferably, the lamp frame assembly further includes a first connecting pressure bar and a second connecting pressure bar; when the first lamp frame and the second lamp frame are in the first state, the first connecting pressure bar detachably abuts against the first pivot cover and is respectively connected to the first lamp frame and the second lamp frame; and the second connecting pressure bar detachably abuts against the second pivot cover and is respectively connected to the first lamp frame and the second lamp frame.

Preferably, each of the first connecting pressure bar and the second connecting pressure bar comprises an abutting portion and abutting portions located at two ends of the abutting portion; through holes are formed in the connecting portions; and the connecting portions are fixedly connected to the first lamp frame and the second lamp frame through locking members passing through the through holes.

Preferably, the first lamp frame and the second lamp frame are approximately semicircular structures, and the first lamp frame and the second lamp frame can be rotatably unfolded into approximately circular structures; and/or, the central assembly further includes a fan blade shaft connected to the control mechanism; and the fan blade assembly is detachably connected to the fan blade shaft.

Preferably, each of the first lamp frame and the second lamp frame includes a connecting frame body connected to the first connecting rod and the second connecting rod, and a lighting frame body located below the connecting frame body; and a light strip is arranged inside the lighting frame body.

Preferably, the lighting frame body is configured to have a diamond-shaped surface.

According to the fan light provided in the present disclosure, in one aspect, the fan blade assembly is configured to be detachably connected to the central assembly, to implement convenient mounting and removal of the fan blade assembly. In another aspect, the lamp frame assembly is configured to have the first state of rotatable unfolding and the second state of rotatable folding, which reduces a storage volume of the fan light, avoids transportation damage, and reduces transportation costs. Meanwhile, no complex mounting step is required before use; no additional use burden is added for a user; and good user experience is provided.

DETAILED DESCRIPTION OF THE EMBODIMENTS

Figure 1:
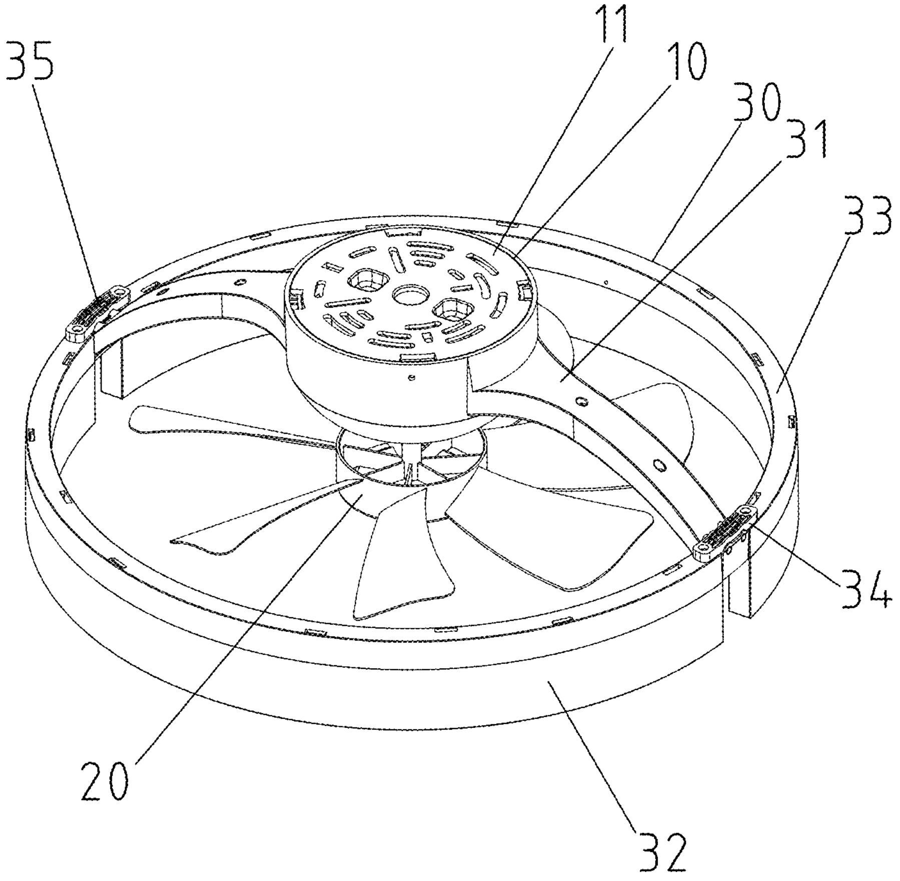
FIG. 1 is a schematic diagram of a three-dimensional structure of a fan light provided in an embodiment of the present disclosure.
Figure 2:
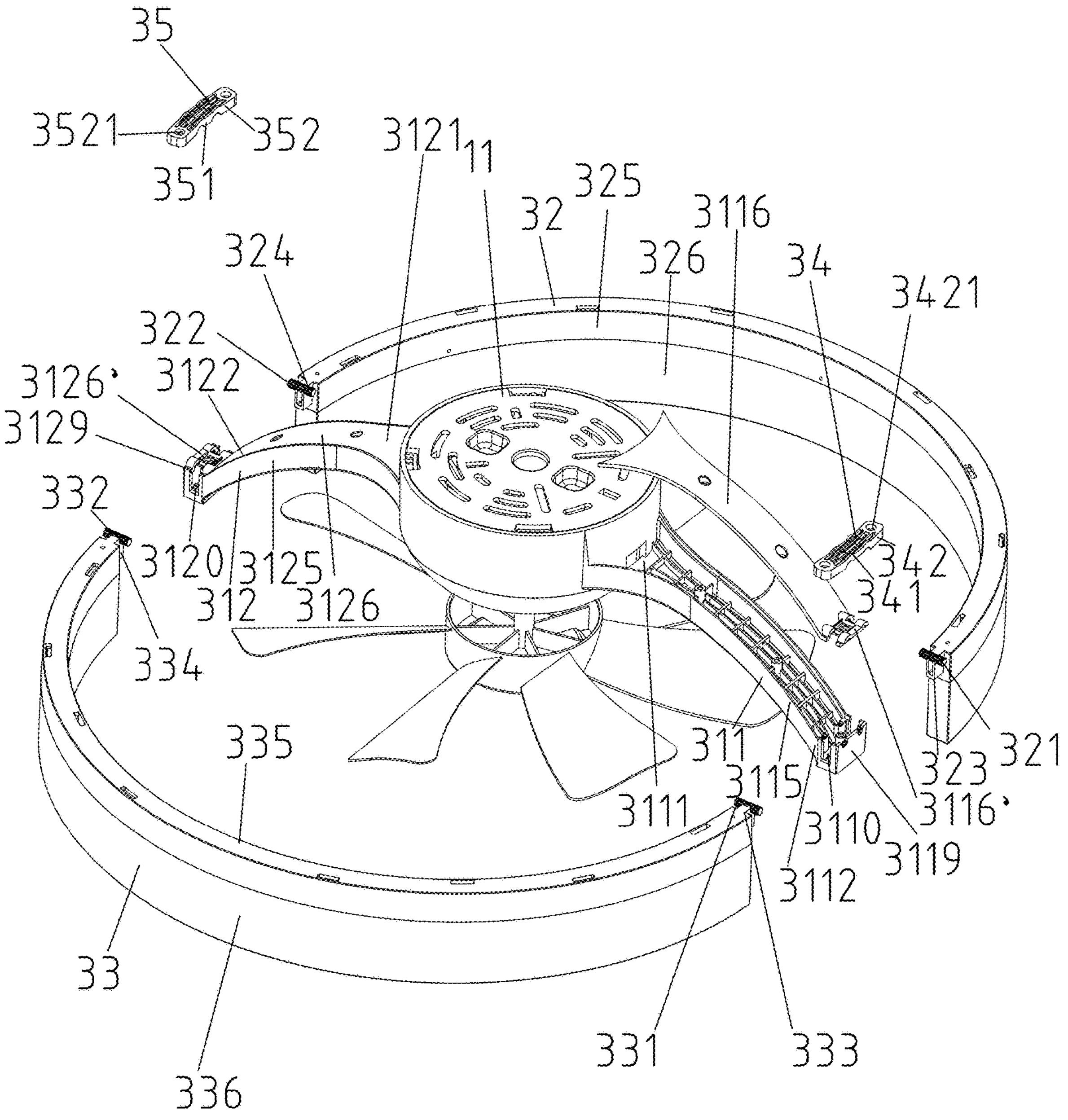
FIG. 2 is a schematic diagram of a three-dimensional structure of disassembling of some elements of the fan light in FIG. 1.
Figure 3:
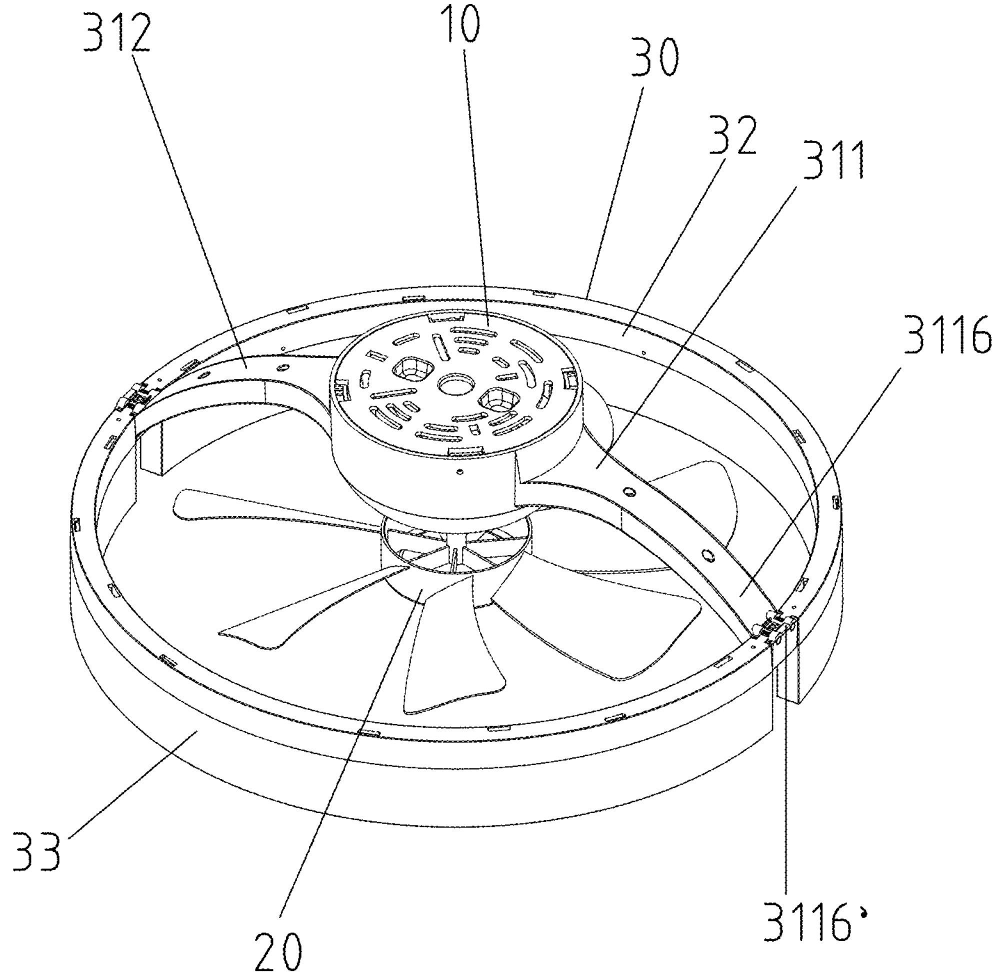
FIG. 3 is a schematic diagram of a three-dimensional structure of the fan light in FIG. 1, with some elements omitted.
Figure 4:
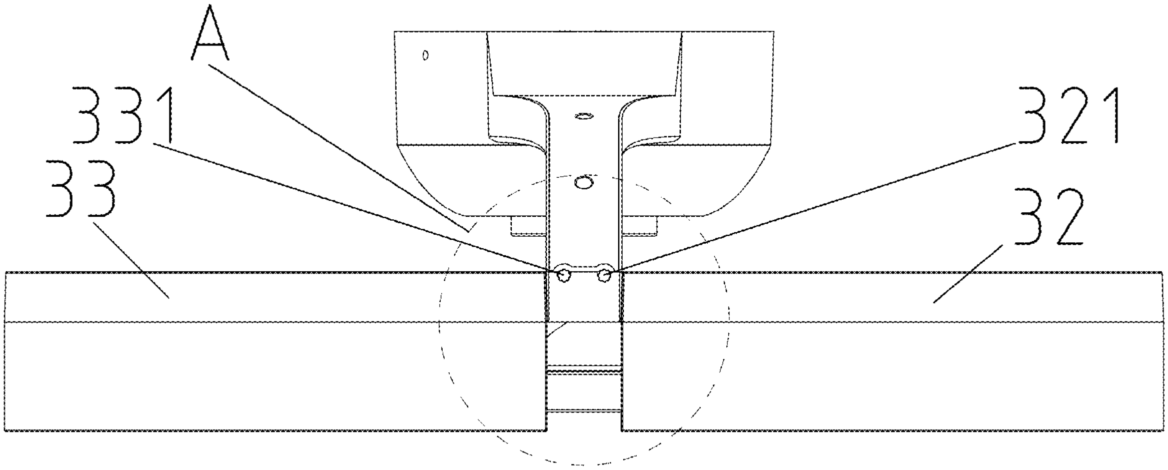
FIG. 4 is a schematic diagram of a side view of the fan light in FIG. 3.
Figure 5:
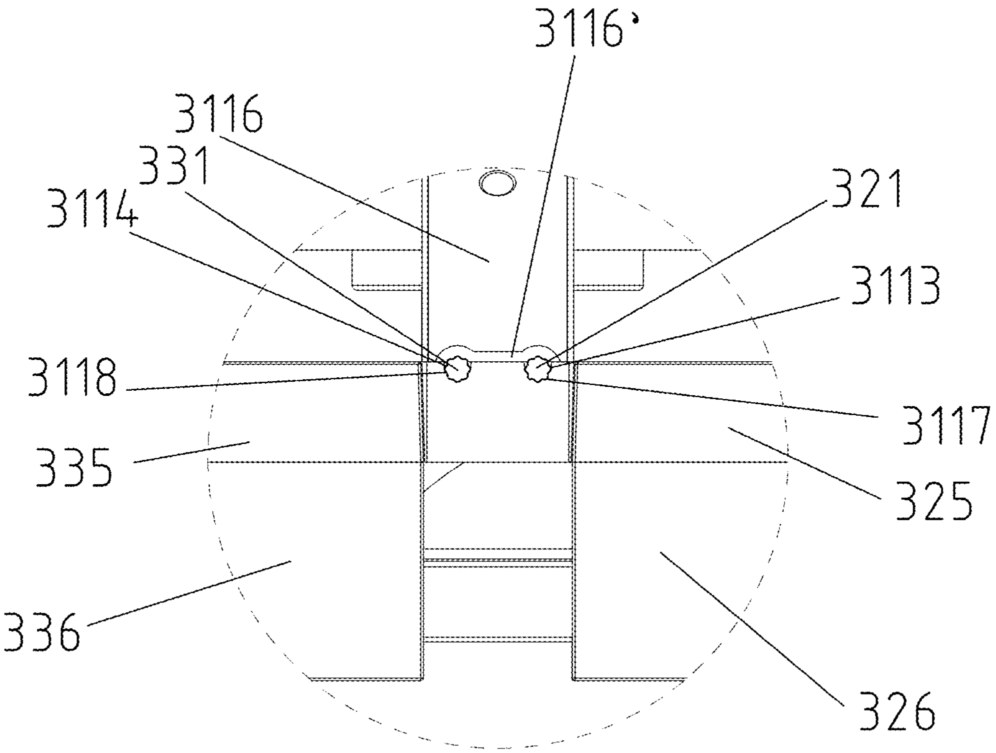
FIG. 5 is an enlarged view of part A in FIG. 4.
Figure 6:
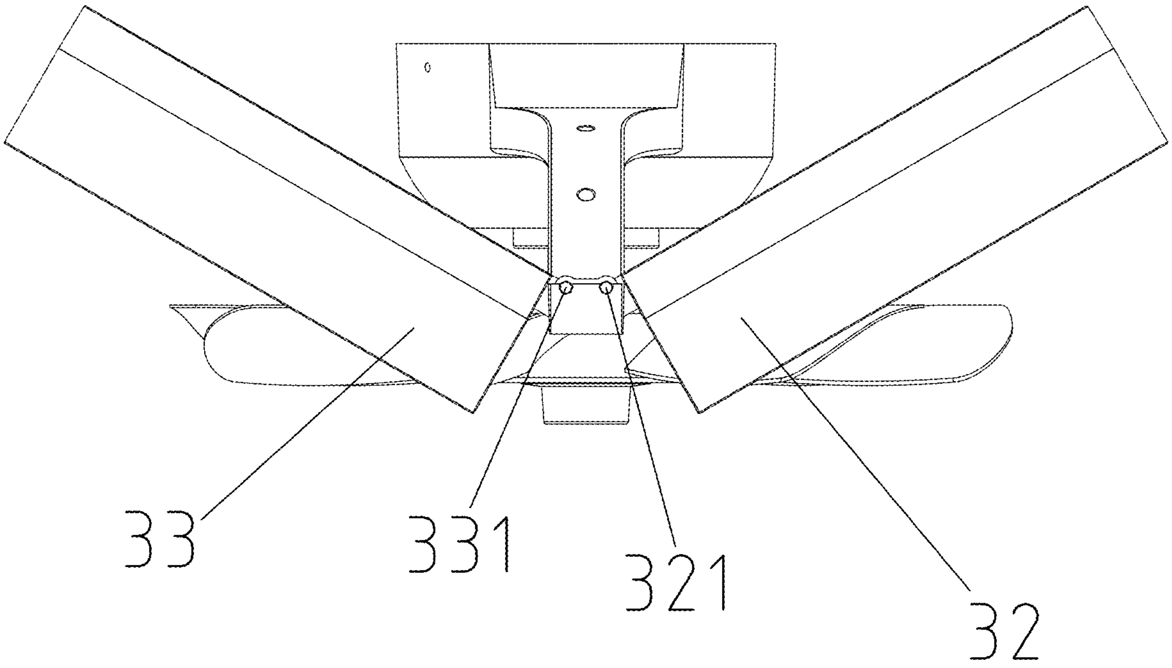
FIG. 6 is a schematic diagram of a side view of the fan light in FIG. 3 being in a second state.
Figure 7:
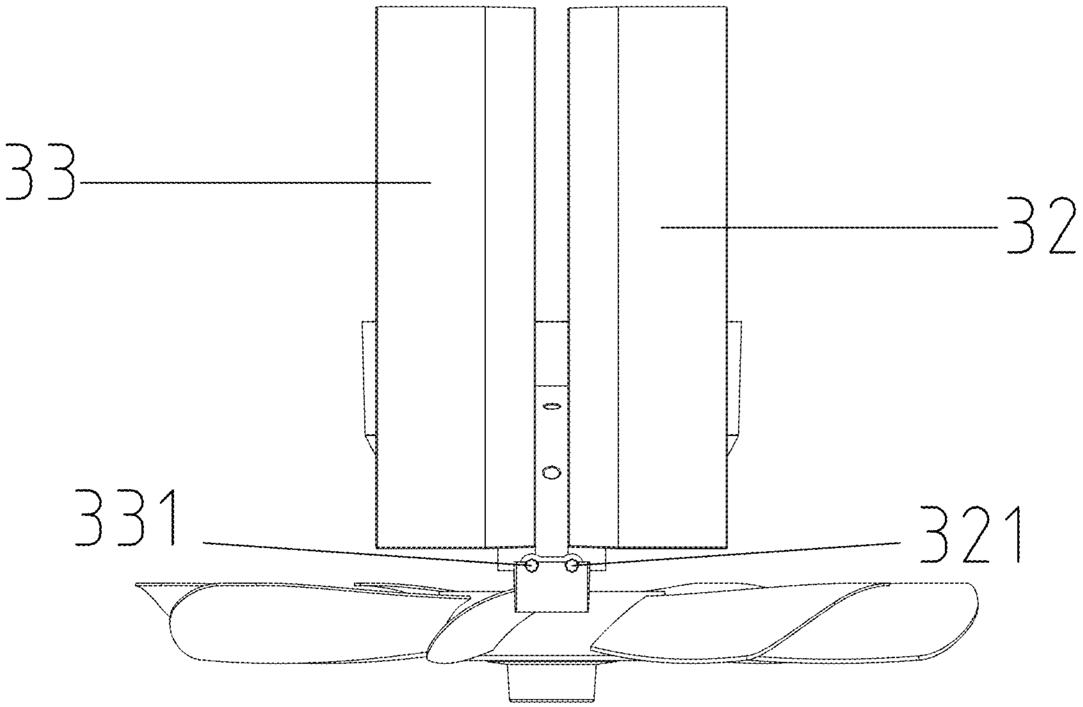
FIG. 7 is a schematic diagram of a side view of the fan light in FIG. 3 being in a third state.

Detail description of the embodiments of present disclosure will be made in the following, and examples thereof are illustrated in the drawings, throughout which identical or similar elements or elements of identical or similar functions are represented with identical or similar reference numerals. The embodiments that are described with reference to the accompanying drawings are exemplary, and are only used to interpret the present disclosure, instead limiting the present disclosure.

The following disclosure provides many different embodiments or examples to implement different structures of the present disclosure. In order to simplify the disclosure of the present disclosure, components and settings of specific examples are described below. Certainly, they are merely examples and are not intended to limit the present disclosure. In addition, the present disclosure may repeatedly refer to numbers and/or letters in different examples. Such repetition is for purposes of simplicity and clarity and does not itself indicate a relationship between the various embodiments and/or settings discussed. In addition, the present disclosure provides examples of various specific processes and materials, but a person of ordinary skill in the art will recognize the application of other processes and/or the use of other materials.

The present disclosure aims to provide a fan light, which is applied to indoor decoration and has a lighting function and a fan function.

Referring to FIG. 1 to FIG. 7, a fan light includes:

a central assembly 10, which includes a housing 11 and a control mechanism (not shown) mounted inside the housing 11, where the housing 11 can be connected to an external mounting structure;

a fan blade assembly 20, which is detachably in pivotal connection to the control mechanism; and a lamp frame assembly 30, which includes a connector 31 connected to the housing 11, and a first lamp frame 32 and a second lamp frame 33 that are connected to the connector 31, where the first lamp frame 32 and the second lamp frame 33 are configured to have a first state of being rotatably unfolded relative to the connector 31 and surrounding the fan blade assembly 20, and a second state of being rotatably folded relative to the connector 31.

Specifically, the housing 11 of the central assembly 10 can be directly mounted on an indoor top wall or mounted on the indoor top wall through a hanger rod. The control mechanism includes a circuit structure, a motor, and the like and can be connected to an external power supply. The motor is driven to drive the fan blade assembly to rotate and controls a lighting element of the fan light to work, thereby implementing lighting.

Further, the connector 31 includes a first connecting rod 311 and a second connecting rod 312 that are respectively connected to two opposite sides of the housing 11; a first head end 3111 of the first connecting rod 311 and a second head end 3121 of the second connecting rod 312 are respectively connected to the housing 11; a first tail end 3112 of the first connecting rod 311 and a second tail end 3122 of the second connecting rod 312 respectively extend away from the housing 11; two ends of the first lamp frame 32 are respectively rotatably connected to the first tail end 3112 and the second tail end 3122; two ends of the second lamp frame 33 are correspondingly respectively rotatably connected to the first tail end 3112 and the second tail end 3122; and the first lamp frame 32 and the second lamp frame 33 are capable of being rotatably unfolded into a roughly frame structure and/or being rotatably folded to one side of the housing 11 facing away from the fan blade assembly 20.

In this embodiment, the two symmetric connecting rods support and connect the lamp frame assembly 30, and the first lamp frame 32 and the second lamp frame 33 are symmetric to each other and are respectively correspondingly in pivotal connection to the connecting rods. It can be understood that the first lamp frame 32 and the second lamp frame 33 are rotatably unfolded into the frame structure which may be specifically a circular structure. The first lamp frame 32 and the second lamp frame 33 are respectively of semicircular structures. After the first lamp frame 32 and the second lamp frame 33 are folded, the lamp frame assembly 30 is switched from the circular frame structure into a compact flat structure, which greatly reduces a volume. The first lamp frame 32 and the second lamp frame 33 may also be in other shapes. For example, to combine and form a square frame structure, the first lamp frame 32 and the second lamp frame 33 are respectively half frame structures of a square.

It can be understood that one connecting rod is omitted. The first lamp frame 32 and the second lamp frame 33 are independently rotatably connected to a large connecting rod respectively. This can also meet an improvement requirement for rotatable folding.

Further, a first pivot hole 3113 and a second pivot hole 3114 are formed in the first tail end 3112 of the first connecting rod 311; a third pivot hole and a fourth pivot hole are formed in the second tail end 3122 of the second connecting rod 312; a first pivot shaft 321 correspondingly connected to the first pivot hole 3113 is arranged at one end of the first lamp frame 32; a second pivot shaft 331 correspondingly connected to the second pivot hole 3114 is arranged at one end of the second lamp frame 33; a third pivot shaft 322 correspondingly connected to the third pivot hole is arranged at another end of the first lamp frame 32; and a fourth pivot shaft 332 correspondingly connected to the fourth pivot hole is arranged at another end of the second lamp frame 33. The third pivot hole and the fourth pivot hole are completely symmetrically arranged with the first pivot hole 3113 and the second pivot hole 3114, so numerals in the figures are omitted.

In this embodiment, the first lamp frame 32 and the second lamp frame 33 are in pivotal connection to the first connecting rod 311 and the second connecting rod 312 through a shaft fit structure, thereby implementing that a direction of the pivot shafts is parallel to a direction of rod bodies of the connecting rods, so that the first lamp frame 32 and the second lamp frame 33 are rotatably unfolded and rotatably folded relative to the connecting rods.

Referring to FIG. 3 to FIG. 7 together, cross sections of the first pivot shaft 321 and the second pivot shaft 331 are polygonal. Correspondingly, the first pivot hole 3113 and the second pivot hole 3114 are configured as matching polygonal hole structures. Relative rotation between the shafts and the holes is divided into a plurality of equal strokes, so that a relative rotation angle is fixed. For example, from an unfolded state to a folded state, relative rotation stay angles of the first lamp frame 32 and the second lamp frame 33 are 0°, 30°, 60°, and 90°.

Further, the first connecting rod 311 includes a first rod shell 3115 slantways extending outwards and downwards from the housing 11 and a first rod cover 3116 covering the first rod shell 3115; the first rod shell 3115 is provided with a first pivot slot 3117 and a second pivot slot 3118 in the first tail end 3112; the first rod cover 3116 forms the first pivot hole 3113 and the second pivot hole 3114 respectively together with the first pivot slot 3117 and the second pivot slot 3118; the second connecting rod 312 includes a second rod shell 3125 slantways extending outwards and downwards from the housing 11 and a second rod cover 3126 covering the second rod shell 3125; the second rod shell 3125 is provided with a third pivot slot and a fourth pivot slot in the second tail end 3122; and the second rod cover 3126 forms the third pivot hole and the fourth pivot hole respectively together with the third pivot slot and the fourth pivot slot. The third pivot hole, the fourth pivot hole, the third pivot slot, and the fourth pivot slot are symmetric to the first pivot hole, the second pivot hole, the first pivot slot, and the second pivot slot, so the corresponding numbers in the figure are omitted.

In this embodiment, the demountable connecting rods are implemented through the rod bodies and the rod covers that are split, and the pivot holes are opened to facilitate the mounting of the lamp frames. It can be understood that this embodiment provides a pivot hole structure with a combined structure. In other embodiments, the pivot holes can also be directly formed in the connecting rods, for example, in inner surfaces relative to the fan blade assembly 20. Correspondingly, the pivot shafts are arranged on opposite outer sides of the lamp frames, and the pivot shafts are correspondingly accommodated in the pivot holes, thus implementing a pivotally connected structure.

Further, the first rod shell 3115 is provided with a first pivot block 3119 at the first tail end 3112; the first pivot slot 3117, the second pivot slot 3118, and a first accommodating slot 3110 located below the first pivot slot 3117 and the second pivot slot 3118 are formed in the first pivot block 3119; a first pivot cover 3116' capable of covering the first pivot slot 3117 and the second pivot slot 3118 is arranged at the first tail end 3112 of the first rod cover 3116; a first accommodating block 323 capable of accommodating the first accommodating slot 3110 is arranged at one end of the first lamp frame 32; a second accommodating block 333 capable of accommodating the first accommodating slot 3110 is arranged at one end of the second lamp frame 33; the first pivot shaft 321 is arranged at a tail end of the first accommodating block 323; the second pivot shaft 331 is arranged at a tail end of the second accommodating block 333;

the second rod shell 3125 is provided with a second pivot block 3129 at the second tail end 3122; the third pivot slot, the fourth pivot slot, and a second accommodating slot 3120 located below the third pivot slot and the fourth pivot slot are formed in the second pivot block 3129; a second pivot cover 3126' capable of covering the third pivot slot and the fourth pivot slot 3128 is arranged at the second tail end 3212 of the second rod cover 3126 a third accommodating block 324 capable of accommodating the second accommodating slot 3120 is arranged at one end of the second lamp frame 32; a fourth accommodating block 334 capable of accommodating the second accommodating slot 3120 is arranged at another end of the second lamp frame 33; the third pivot shaft 322 is arranged at a tail end of the third accommodating block 324; and the fourth pivot shaft 332 is arranged at a tail end of the fourth accommodating block 334.

In this embodiment, by the arrangement of the accommodating slots and the arrangement of the corresponding accommodating blocks on the lamp frames, a close fit structure between frame bodies and the connector is implemented.

Further, the lamp frame assembly 30 further includes a first connecting pressure bar 34 and a second connecting pressure bar 35; when the first lamp frame 32 and the second lamp frame 33 are in the first state, the first connecting pressure bar 34 detachably abuts against the first pivot cover 3116' and is respectively connected to the first lamp frame 32 and the second lamp frame 33; and the second connecting pressure bar 35 detachably abuts against the second pivot cover 3126' and is respectively connected to the first lamp frame 32 and the second lamp frame 33. In this embodiment, the connecting pressure bar is configured to: abut against and fix the first lamp frame 32 and the second lamp frame 33 in a fixed rotatably unfolded state and implement limitation.

Preferably, each of the first connecting pressure bar 34 and the second connecting pressure bar 35 includes an abutting portion 341, 351 and abutting portions 342, 352 located at two ends of the abutting portion 341, 351; through holes 3421, 3521 are formed in the connecting portions 342, 352; and the connecting portions 342, 352 are fixedly connected to the first lamp frame 32 and the second lamp frame 33 through locking members passing through the through holes 3421, 3521. In this embodiment, the first lamp frame 32 and the second lamp frame 33 are mounted and fixed to the connecting rods through the locking members, so that the structure is simple, and the connection is stable.

Figure 8:
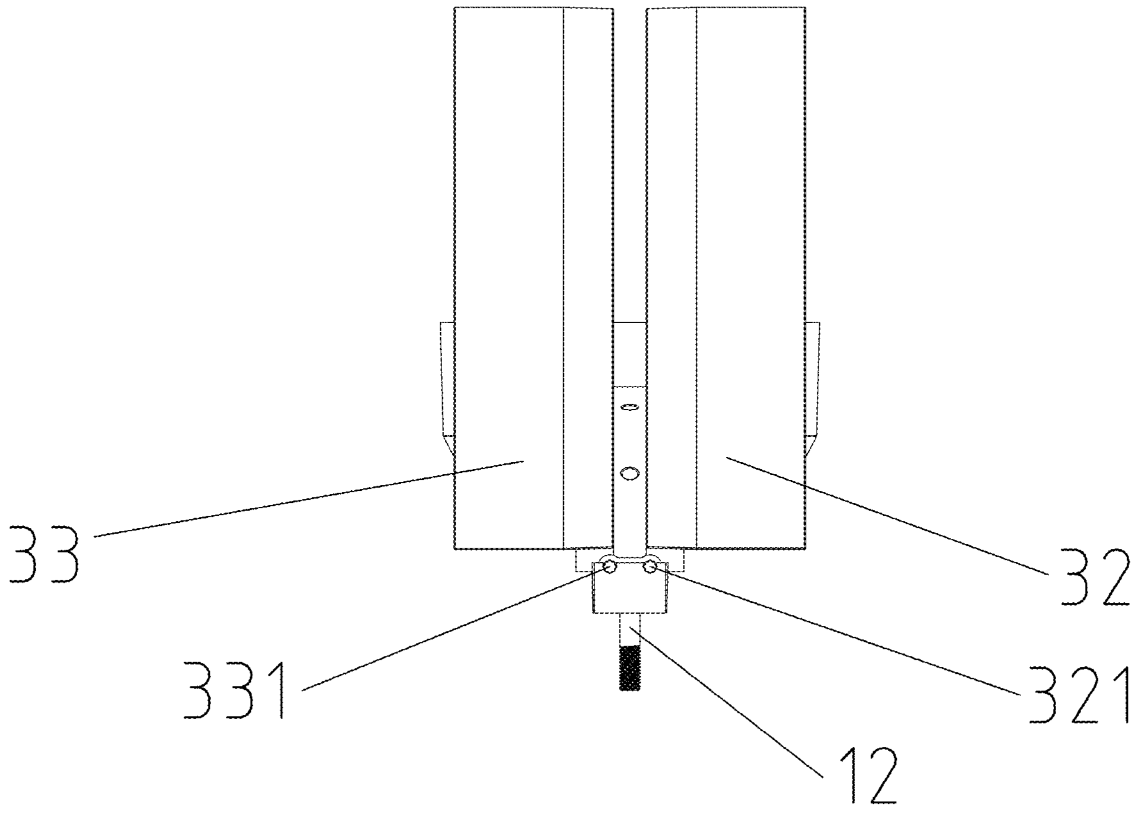
FIG. 8 is a schematic diagram of a side view of the fan light in FIG. 7 without a fan blade assembly.

Further, the first lamp frame 32 and the second lamp frame 33 are approximately semicircular structures, and the first lamp frame 32 and the second lamp frame 33 can be rotatably unfolded into approximately circular structures; and/or, Referring to FIG. 8, further, the central assembly 10 further includes a fan blade shaft 12 connected to the control mechanism; and the fan blade assembly 20 is detachably connected to the fan blade shaft 12.

Further, each of the first lamp frame 32 and the second lamp frame 33 includes a connecting frame body 325, 335 connected to the first connecting rod 311 and the second connecting rod 312, and a lighting frame body 326, 336 located below the connecting frame body 325, 335; and a light strip is arranged inside the lighting frame body 326, 336. Through the structure of this embodiment, a lighting function of the fan light is achieved.

Figure 9:
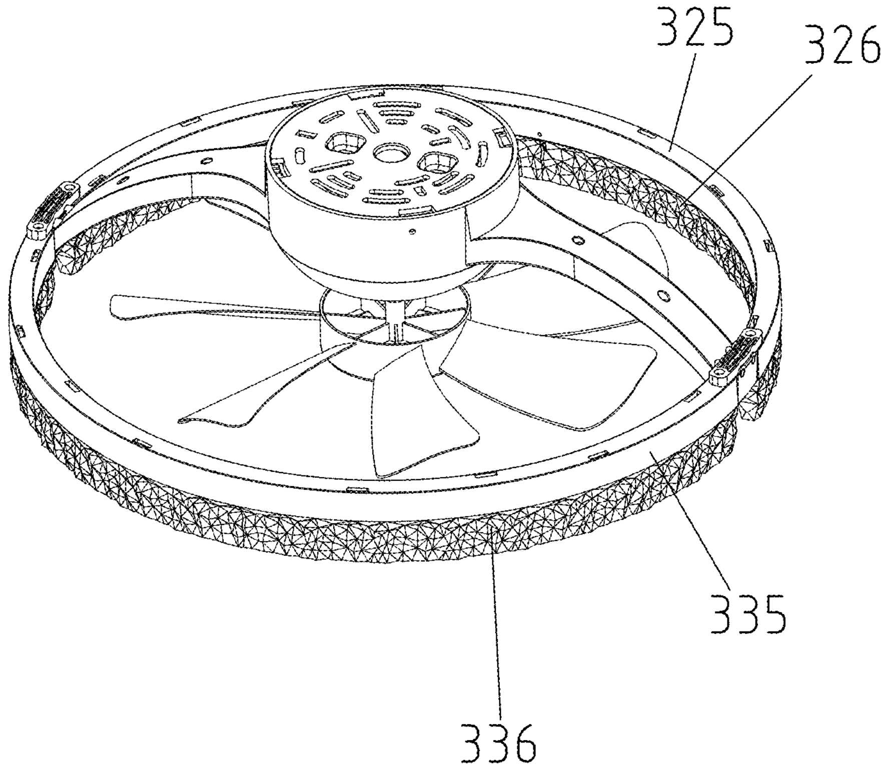
FIG. 9 is a schematic diagram of a three-dimensional structure of a fan light provided in another embodiment of the present disclosure.

Referring to FIG. 9, further, the lighting frame body 326, 336 is configured to have a diamond-shaped surface. In this embodiment, since surfaces of the lighting frame bodies 326, 336 are set to be diamond-shaped, light with a diamond texture can be generated.

According to the fan light provided in the present disclosure, in one aspect, the fan blade assembly 20 is configured to be detachably connected to the central assembly 10, to implement convenient mounting and removal of the fan blade assembly 20. In another aspect, the lamp frame assembly 30 is configured to have the first state of rotatable unfolding and the second state of rotatable folding, which increases a storage volume of the fan light, avoids transportation damage, and reduces transportation costs. Meanwhile, no complex mounting step is required before use; no additional use burden is added for a user; and good user experience is provided.

In the description of this specification, the description referring to the terms "one embodiment", "some embodiments", "an example", "specific examples", "some examples", or the like means that specific features, structures, materials or characteristics described in connection with the embodiments or examples are included in at least one embodiment or example of the present disclosure. In this specification, the schematic representations of the above terms are not necessarily intended to refer to the same embodiment or example. Furthermore, the specific features, structures, materials or characteristics described may be combined in any suitable manner in any one or more embodiments or examples. In addition, those skilled in the art may combine the different embodiments or examples described in this specification, as well as the features of different embodiments or examples, without mutual contradictions.

Although the embodiments of the present disclosure have been shown and described, it can be understood by those of ordinary skill in the art that various changes, modifications, substitutions variations can be made to these embodiments without departing from the principle and concept of the present disclosure. The scope of the present disclosure is defined by the claims and their equivalents.

What is claimed is:

1. A fan light, comprising:

a central assembly, which comprises a housing and a control mechanism mounted inside the housing, wherein the housing is capable of being connected to an external mounting structure;

a fan blade assembly, which is detachably and rotatably to the control mechanism; and a lamp frame assembly, which comprises a connector connected to the housing, and a first lamp frame and a second lamp frame that are connected to the connector, wherein the first lamp frame and the second lamp frame are configured to have a first state of being rotatably unfolded relative to the connector and surrounding the fan blade assembly, and a second state of being rotatably folded relative to the connector;

wherein the central assembly further comprises a fan blade shaft connected to the control mechanism; and the fan blade assembly is detachably connected to the fan blade shaft.

2. The fan light according to claim 1, wherein the connector comprises a first connecting rod and a second connecting rod that are respectively connected to two opposite sides of the housing; a first head end of the first connecting rod and a second head end of the second connecting rod are respectively connected to the housing; a first tail end of the first connecting rod and a second tail end of the second connecting rod respectively extend away from the housing; two ends of the first lamp frame are respectively rotatably connected to the first tail end and the second tail end; two ends of the second lamp frame are correspondingly respectively rotatably connected to the first tail end and the second tail end; and the first lamp frame and the second lamp frame are capable of being rotatably unfolded into a roughly frame structure and/or being rotatably folded to one side of the housing facing away from the fan blade assembly.

3. The fan light according to claim 2, wherein a first pivot hole and a second pivot hole are formed in the first tail end of the first connecting rod; a third pivot hole and a fourth pivot hole are formed in the second tail end of the second connecting rod; a first pivot shaft correspondingly connected to the first pivot hole is arranged at one end of the first lamp frame; a second pivot shaft correspondingly connected to the second pivot hole is arranged at one end of the second lamp frame; a third pivot shaft correspondingly connected to the third pivot hole is arranged at another end of the first lamp frame; and a fourth pivot shaft correspondingly connected to the fourth pivot hole is arranged at another end of the second lamp frame.

4. The fan light according to claim 3, wherein the first connecting rod comprises a first rod shell slantways extending outwards and downwards from the housing and a first rod cover covering the first rod shell; the first rod shell is provided with a first pivot slot and a second pivot slot in the first tail end; the first rod cover forms the first pivot hole and the second pivot hole respectively together with the first pivot slot and the second pivot slot; the second connecting rod comprises a second rod shell slantways extending outwards and downwards from the housing and a second rod cover covering the second rod shell; the second rod shell is provided with a third pivot slot and a fourth pivot slot in the second tail end; and the second rod cover forms the third pivot hole and the fourth pivot hole respectively together with the third pivot slot and the fourth pivot slot.

5. The fan light according to claim 4, wherein the first rod shell is provided with a first pivot block at the first tail end; the first pivot slot, the second pivot slot, and a first accommodating slot located below the first pivot slot and the second pivot slot are formed in the first pivot block; a first pivot cover capable of covering the first pivot slot and the second pivot slot is arranged at the first tail end of the first rod cover; a first accommodating block capable of accommodating the first accommodating slot is arranged at one end of the first lamp frame; a second accommodating block capable of accommodating the first accommodating slot is arranged at one end of the second lamp frame; the first pivot shaft is arranged at a tail end of the first accommodating block; the second pivot shaft is arranged at a tail end of the second accommodating block;

the second rod shell is provided with a second pivot block at the second tail end; the third pivot slot, the fourth pivot slot, and a second accommodating slot located below the third pivot slot and the fourth pivot slot are formed in the second pivot block; a second pivot cover capable of covering the third pivot slot and the fourth pivot slot is arranged at the second tail end of the second rod cover; a third accommodating block capable of accommodating the second accommodating slot is arranged at one end of the second lamp frame; a fourth accommodating block capable of accommodating the second accommodating slot is arranged at another end of the second lamp frame; the third pivot shaft is arranged at a tail end of the third accommodating block; and the fourth pivot shaft is arranged at a tail end of the fourth accommodating block.

6. The fan light according to claim 5, wherein the lamp frame assembly further comprises a first connecting pressure bar and a second connecting pressure bar; when the first lamp frame and the second lamp frame are in the first state, the first connecting pressure bar detachably abuts against the first pivot cover and is respectively connected to the first lamp frame and the second lamp frame; and the second connecting pressure bar detachably abuts against the second pivot cover and is respectively connected to the first lamp frame and the second lamp frame.

7. The fan light according to claim 6, wherein each of the first connecting pressure bar and the second connecting pressure bar comprises an abutting portion and abutting portions located at two ends of the abutting portion; through holes are formed in the connecting portions; and the connecting portions are fixedly connected to the first lamp frame and the second lamp frame through locking members passing through the through holes.

8. The fan light according to claim 1, wherein the first lamp frame and the second lamp frame are approximately semicircular structures, and the first lamp frame and the second lamp frame are rotatably unfolded into approximately circular structures.

9. The fan light according to claim 1, wherein each of the first lamp frame and the second lamp frame comprises a connecting frame body connected to the first connecting rod and the second connecting rod, and a lighting frame body located below the connecting frame body; and a light strip is arranged inside the lighting frame body.

10. The fan light according to claim 9, wherein the lighting frame body is configured to have a diamond-shaped surface.

* * * * *